(12) United States Patent
Dacre-Wright et al.

(10) Patent No.: US 8,332,145 B2
(45) Date of Patent: Dec. 11, 2012

(54) METHOD FOR CONTINUOUSLY AND ADAPTIVELY GENERATING A SPEED SETPOINT FOR AN AIRCRAFT TO OBSERVE AN RTA (75) Inventors: Benoît Dacre-Wright, Lauzerville (FR); Guy Deker, Cugnaux (FR); Xavier Blanchon, Toulouse (FR)

(73) Assignee: Thales (FR)

( * ) Notice: Subject to any disclaimer, the term of this patent is extended or adjusted under 35 U.S.C. 154(b) by 260 days.

(21) Appl. No.: 12/790,596

(22) Filed: May 28, 2010

(65) Prior Publication Data

US 2011/0137493 A1    Jun. 9, 2011

(30) Foreign Application Priority Data

May 29, 2009  (FR) ...................... 09 02613

(51) Int. Cl.
*G05D 1/00*        (2006.01)
(52) U.S. Cl. .......................... 701/465; 701/3
(58) Field of Classification Search .............. 701/3, 465
See application file for complete search history.

(56) References Cited

U.S. PATENT DOCUMENTS

| | | | | |
|---|---|---|---|---|
| 5,121,325 A * | 6/1992 | DeJonge | ..................... | 701/123 |
| 6,507,782 B1 * | 1/2003 | Rumbo et al. | ................ | 701/121 |
| 6,600,991 B1 * | 7/2003 | Jardin | ........................... | 701/467 |
| 6,970,784 B2 * | 11/2005 | Shinagawa | ..................... | 701/465 |
| 8,010,267 B2 * | 8/2011 | Klooster et al. | ................ | 701/66 |
| 8,150,565 B2 * | 4/2012 | Wachenheim et al. | ........... | 701/5 |
| 2004/0239550 A1 * | 12/2004 | Daly, Jr. | ...................... | 342/26 B |
| 2007/0288130 A1 * | 12/2007 | Lemoult et al. | ................. | 701/14 |
| 2008/0103646 A1 | 5/2008 | Lucas et al. | | |
| 2008/0228333 A1 | 9/2008 | De Menorval et al. | | |
| 2009/0112454 A1 | 4/2009 | Wachenheim et al. | | |
| 2009/0259351 A1 * | 10/2009 | Wachenheim et al. | ........... | 701/7 |
| 2010/0114407 A1 * | 5/2010 | Klooster et al. | ................... | 701/3 |
| 2010/0125382 A1 * | 5/2010 | Wachenheim et al. | ......... | 701/18 |
| 2010/0131124 A1 * | 5/2010 | Klooster | .......................... | 701/3 |
| 2010/0152930 A1 * | 6/2010 | Coulmeau et al. | ................ | 701/7 |
| 2010/0217459 A1 * | 8/2010 | Caillaud et al. | ................... | 701/3 |

FOREIGN PATENT DOCUMENTS

| | | |
|---|---|---|
| EP | 1770365 A1 | 4/2007 |
| FR | 2907952 A1 | 5/2005 |
| FR | 2913780 A1 | 9/2008 |
| FR | 2923032 A1 | 5/2009 |
| FR | 2938327 A1 | 5/2010 |
| WO | 02/093281 A1 | 11/2002 |
| WO | 2007/067326 A1 | 6/2007 |

OTHER PUBLICATIONS

French Preliminary Search Report, dated May 20, 2010 for FR application No. 09 02613.

* cited by examiner

*Primary Examiner* — James Trammell
*Assistant Examiner* — Truc M Do
(74) *Attorney, Agent, or Firm* — Baker & Hostetler, LLP (57) ABSTRACT

Method for generating a flight speed profile of an aircraft (100) according to an RTA constraint, characterized in that it permanently calculates, at any point of the flight plan, a speed setpoint $V_\Omega(X)$ of the aircraft determined on the basis of reference speed profiles, comprising at least a minimum speed profile $V_{min}(X)$, and a maximum speed profile $V_{max}(X)$. The method can also take into account an optimum speed profile $V_{opt}(X)$ determined, for example, on the basis of a cost or performance index.

14 Claims, 9 Drawing Sheets

METHOD FOR CONTINUOUSLY AND ADAPTIVELY GENERATING A SPEED SETPOINT FOR AN AIRCRAFT TO OBSERVE AN RTA

CROSS-REFERENCE TO RELATED APPLICATIONS

This application claims priority to foreign France patent application No. 0902613, filed on May 29, 2009, the disclosure of which is hereby incorporated by reference in its entirety.

FIELD OF THE INVENTION

The present invention relates to a method for continuously and adaptively generating a speed setpoint for an aircraft to observe an RTA. It applies notably to the field of avionics, and more particularly to a flight management device of an aircraft, designated hereinafter by the acronym FMS, standing for Flight Management System.

BACKGROUND OF THE INVENTION

In the general context of air traffic, it is a fact that the traffic density is increasing year-on-year. At the same time, it is necessary for the environmental impact of the air traffic to be reduced. Finally, it is necessary for the accident rate to be kept at the current level, or even reduced. Respecting these principles and requirements notably requires the air traffic control organizations to exercise increasingly tight control on the flight profiles of the aircraft occupying the air space. At the same time, it is necessary for the operators of these aircraft to implement devices whose function is to satisfy the requests originating from the air traffic control organizations, while minimizing their impact, notably on the piloting procedures, the initial flight plan, and observance of the provisions in terms of aircraft operating cost.

Typically, the air traffic control organizations can impose passages at given points of the air space on the aircraft, at given times, or RTA (Requested Time of Arrival) for a scheduled time constraint or CTA (Controlled Time of Arrival) for a time constraint activated by the air traffic controller. Hereinafter, these two types of constraint will be designated RTA without distinction. To observe an RTA, the pilot of an aircraft must control the speed profile along the flight plan. To this end, there are devices known from the prior art that assist or even supplant the pilot; such devices are notably implemented in the FMSs of aircraft that are equipped therewith.

Typically, such devices determine a performance index, for example a cost index usually designated by the acronym CI, which represents the ratio between the cost in terms of flight time and the cost in terms of fuel. Other indices can be employed; these indices are determined iteratively, and define a proportionality coefficient between different speed profiles. For a given index, the proportionality coefficient is applied uniformly over the entire profile, and makes it possible to obtain, at any point of the flight plan, the speed setpoint to be applied. In a simplified manner, one process then consists in arbitrarily setting a value of the index, calculating the corresponding speed profile, and estimating the time of passage, or ETA (Estimated Time of Arrival), at the point for which the RTA is applied. The index is then corrected, and the process reiterates the calculation of the ETA according to the new speed profile resulting therefrom; this continues until the ETA is sufficiently close to the RTA according to a predetermined criterion corresponding, for example, to a desired maximum time difference. Such a method has a certain number of drawbacks:

- determining the speed profile with which to observe the RTA requires a number of iterations that may be high, the number of iterations being relatively unpredictable and variable from one calculation to another;
- in some cases, the convergence of the calculation of the index is difficult, because of complex behaviours of the function linking the performance index to the time of passage at the point at which the RTA is applied;
- if there is a drift during a flight relative to the calculated profile, for example because of wind gusts or even unexpected aircraft performance levels, it is necessary for the calculation of the speed profile to be repeated in full. It is also necessary to ensure a relatively short periodicity in the performance of the calculation, in order to keep to precise predictions;
- on approaching the point at which the RTA is applied, it becomes difficult to compensate sufficiently responsively for any drifts.

A first method, described in the patent U.S. Pat. No. 6,507,782, allows for an adaptation of the speed profile according to a local sensitivity of the time of passage to the speed variation. However, this sensitivity is globally consolidated to compensate for the total error on the time of passage. This type of method does not call into question the principle whereby the speed profile must be determined by successive iterations, and each iteration can be likened to an open-loop calculation of the impact of the speed profile adopted on the time of passage resulting therefrom. Furthermore, drifts exhibited during the flight are compensated according to the same method, by iterations over the entire speed profile ahead of the aeroplane.

A second method, described in the patent U.S. Pat. No. 5,121,325, consists in varying the precision margins on the observance of the time of passage, as a function of time, so as not to unnecessarily constrain the speed profile when the aircraft is far from the constraint associated with the RTA, and on the other hand to increase the precision on approaching this point. This method makes it possible to optimize the profile, and improve confidence in the observance of the time constraint imposed by an RTA. On the other hand, this method also relies on an open-loop speed prediction, the slaving to the time of passage being based only on a calculation of predictions relating to the flight plan as a whole.

SUMMARY OF THE INVENTION

One aim of the present invention is to mitigate at least the abovementioned drawbacks, by proposing a method for generating a speed setpoint that is permanently slaved to the time of passage resulting therefrom at the point at which the RTA is applied, the method requiring calculations, the periodicity of which lightens the calculation workload of the device implementing it, for example an FMS.

Another advantage of the invention is that it allows for the application of various strategies for generating the speed setpoint, to ensure sufficient margins for satisfying the time constraint, in particular in the case of unstable or imprecise wind, and optimize the speed profile according to the different flight phases and/or according to the distance relative to the point at which the RTA constraint is applied.

To this end, the subject of the invention is a method for continuously and adaptively generating a speed setpoint for the observance of an RTA, characterized in that it comprises the following steps:

for a determined current position of the aircraft along a flight plan, determination of at least two reference speed profiles according to the curvilinear abscissa X of the aircraft along the flight plan, comprising a minimum speed profile $V_{min}(X)$ and a maximum speed profile $V_{max}(X)$, storage of a plurality of pairs $(T_{Vmin}(X_i), X_i)$ and $(T_{Vmax}(X_i), X_i)$ of values of times of passage of the aircraft at curvilinear abscissa points $X_i$ subsequent to the current position as far as the abscissa of the point at which the RTA is applied for the reference speed profiles, application at any point of curvilinear abscissa X of the flight plan of a speed setpoint $V_\Omega(X)$ of the aircraft determined on the basis of the speed profiles $V_{min}(X)$ and $V_{max}(X)$ weighted by proportionality ratios between $T(X)$, $T_{Vmin}(X)$ and $T_{Vmax}(X)$;

$T(X)$ designating the time of passage of the aircraft at the point of the flight plan of curvilinear abscissa X, $T_{Vmax}(X)$ designating the time of passage at the curvilinear abscissa point X, for a flight according to the minimum speed profile $V_{min}(X)$ reaching the point at which the RTA is applied by observing the RTA constraint, and $T_{Vmin}(X)$ designating the time of passage at the curvilinear abscissa point X, for a flight according to the maximum speed profile $V_{max}(X)$ reaching the point at which the RTA is applied by observing the RTA constraint, the values of $T_{Vmin}(X)$ and $T_{Vmax}(X)$ being determined by a linear interpolation based on the corresponding stored pairs of values for the closest points either side of the curvilinear abscissa point X.

In one embodiment of the invention, the method for generating a flight speed profile of an aircraft can be characterized in that, for the current position of the aircraft along the flight plan, an additional optimum speed reference speed profile $V_{opt}(X)$ is determined according to at least one defined flight criterion, the speed profile of the aircraft being constrained to tend towards the optimum speed profile $V_{opt}(X)$ by the addition to the RTA of a tolerance $\Delta T$ the sign of which is opposite to the sign of the difference between the time of passage of the aircraft at the current position and the corresponding time of passage $T_{Vopt}(X)$, until the absolute value of the difference between $T(X)$ and $T_{Vopt}(X)$ is less than a maximum time difference $\delta t$, the RTA then being restored to its initial value.

In one embodiment of the invention, said at least one defined flight criterion can comprise a cost index.

In one embodiment of the invention, said at least one defined flight criterion can comprise a performance index.

In one embodiment of the invention, the method for generating a flight speed profile of an aircraft can be characterized in that the speed setpoint $V_\Omega(X)$ is determined by the relation:

$$V_\Omega(X) = \frac{(T_{Vmax}(X) - T_{Vmin}(X))V_{min}(X)V_{max}(X)}{(T_{Vmax}(X) - T(X))V_{max}(X) - (T_{Vmin}(X) - T(X))V_{min}(X)}.$$

In one embodiment of the invention, the method for generating a flight speed profile of an aircraft can be characterized in that the speed setpoint $V\Omega(X)$ is determined by the relation:

$$V_\Omega(X) = \frac{(T_{Vmax}(X) - T_{min}(X))V_{Vmin}(X)V_{max}(X)}{(T_{Vmax}(X) - T_{corrected}(X))V_{max}(X) - (T_{Vmin}(X) - T_{corrected}(X))V_{min}(X)},$$

$T_{corrected}(X)$ being equal to $T(X) - \delta t$ if $T(X)$ is less than $T_{Vopt}(X) - \delta t$, to $T(X) + \delta t$ if $T(X)$ is greater than $T_{Vopt}(X) + \delta t$, or to $T(X)$ otherwise.

In one embodiment of the invention, the method for generating a flight speed profile of an aircraft can be characterized in that the speed setpoint $V_\Omega(X)$ is corrected by a value $\delta V(X)$ equal to $$V_{opt}(X) \frac{T_{Vopt}(X) - (T(X) - \Delta T)}{T_{RTA} - (T(X) - \Delta T)}$$

if $T(X)$ is less than $T_{Vopt}(X) - \Delta T$, or to $$V_{opt}(X) \frac{T_{Vopt}(X) - (T(X) + \Delta T)}{T_{RTA} - (T(X) + \Delta T)}$$

if $T(X)$ is greater than $T_{Vopt}(X) + \Delta T$.

In one embodiment of the invention, the method for generating a flight speed profile of an aircraft can be characterized in that it generates a plurality of speed profiles so as to observe a plurality of successive time of passage constraints along the flight plan In one embodiment of the invention, the method for generating a flight speed profile of an aircraft can be characterized in that a plurality of different speed profiles are generated for different flight phases for which the optimum speed profiles are determined on the basis of different flight criteria.

Another subject of the present invention is a flight management system of an aircraft, characterized in that it implements a method according to any one of the preceding claims.

In one embodiment of the invention, the flight management system of an aircraft can be characterized in that it calculates, at any instant of the flight of the aircraft, a speed setpoint to be applied to it.

In one embodiment of the invention, the flight management system of an aircraft can be characterized in that the speed setpoint to be applied is displayed on a display interface.

In one embodiment of the invention, the flight management system of an aircraft can be characterized in that the speed setpoint to be applied is transmitted to an automatic pilot system.

BRIEF DESCRIPTION OF THE DRAWINGS

Other features and advantages of the invention will become apparent upon reading the description, given by way of example, and in light of the appended drawings which represent.

DETAILED DESCRIPTION

Figure 1:
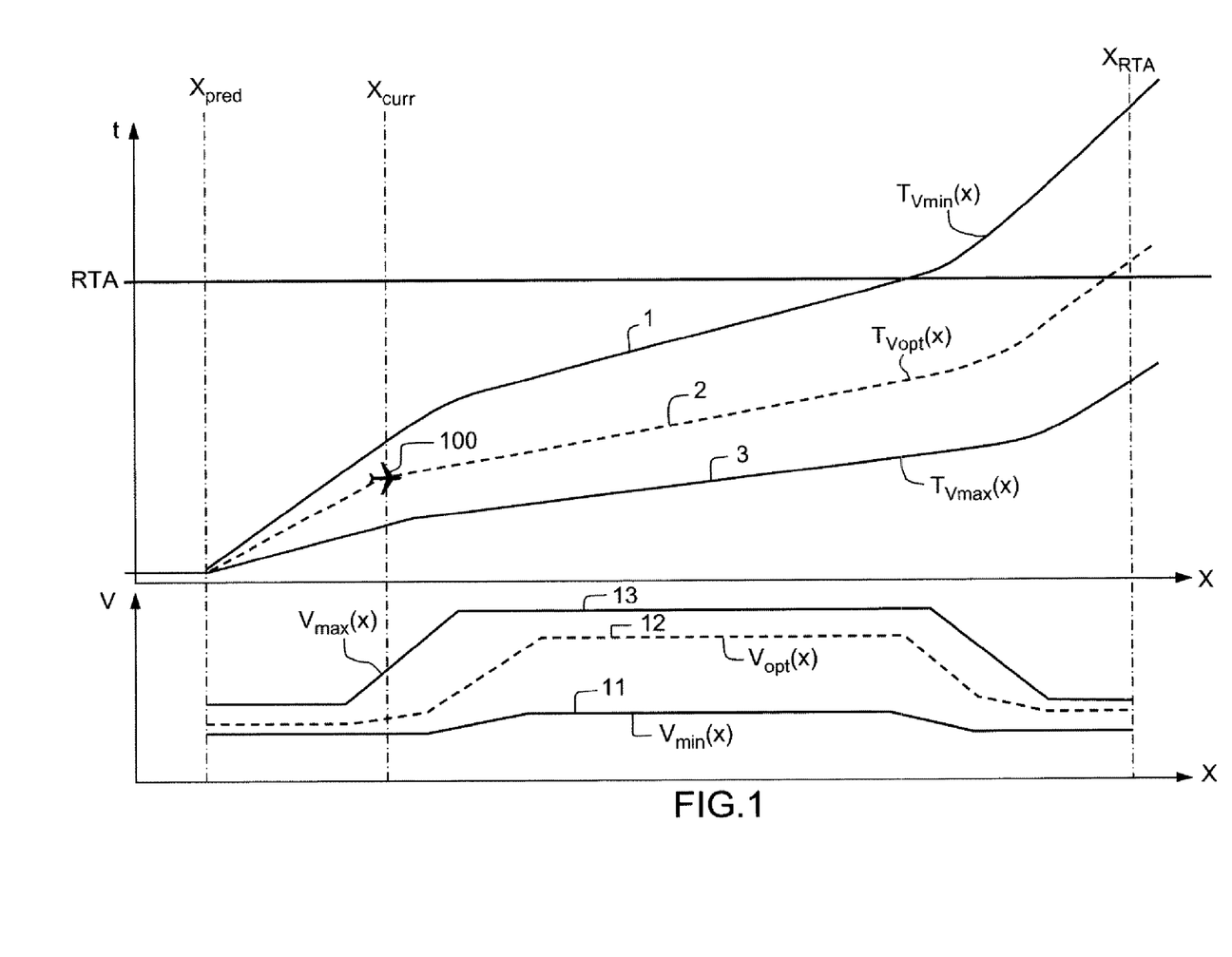
FIG. 1, examples of curves representing the times of passage of an aircraft at curvilinear abscissae along its flight plan, for flights following different speed profiles.

FIG. 1 shows examples of curves representing the times of passage of an aircraft at curvilinear abscissae along its flight plan, for flights following different speed profiles.

Hereinafter, the letter X designates the curvilinear abscissa of an aircraft 100, along a flight plan, that is to say, a distance between a point of the flight plan and a reference point of the flight plan. A prediction of the time of passage $T(X)$ of the aircraft 100 at the curvilinear abscissa X is made at an abscissa point $X_{pred}$.

A first curve 1 represents the times of passage $ETA\_V_{min}(X)$ of the aircraft 100 according to the curvilinear abscissa X, assuming that the latter is moving according to a minimum speed profile $V_{min}(X)$ corresponding to the lower limit of the flight envelope along the profile, possibly augmented by an operational margin in order, for example, to limit acceleration inertia at low speeds or even the temporary risks of excessively low speed generated, for example, by wind shifts. This minimum speed profile is known for the aircraft 100, and depends notably on its performance characteristics, according to the different flight configurations and in the different flight phases according to the flight plan, and on possible additional limitations specified by the pilot or the airline responsible for operating the aircraft.

A second curve 2 represents the times of passage $ETA\_V_{max}(X)$ of the aircraft 100 according to the curvilinear abscissa X, assuming that the latter is moving according to a maximum speed profile $V_{max}(X)$ corresponding to the upper limit of the flight envelope along the profile, possibly reduced by an operational margin in order, for example, to limit the temporary risks of overspeed generated, for example, by wind shifts. Similarly, this maximum speed profile is known for the aircraft 100, and depends notably on its performance characteristics, according to the different flight configurations and in the different flight phases according to the flight plan, and on possible additional limitations specified by the pilot or the airline responsible for operating the aircraft.

A third curve 3 represents the times of passage $ETA\_V_{opt}(X)$ of the aircraft 100 according to the curvilinear abscissa X, assuming that the latter is moving according to an optimum speed profile $V_{opt}(X)$. This optimum speed profile corresponds to optimum flight conditions that do not take into account the RTA constraint, according to determined criteria, for example flight comfort, fuel consumption, or even according to a performance criterion or an index representative of the time/consumed fuel trade-off, etc.

In parallel with the three curves 1, 2 and 3 representing the times of passage of the aircraft 100 according to the curvilinear abscissa X along the flight plan, examples of curves 11, 12 and 13 representing the speed profiles are given in the figure. The three time-of-passage curves tend to be increasing, and the gradient of a time-of-passage curve becomes all the shallower as the speed of the aircraft 100 increases.

It should be noted that, hereinafter, it is considered as a first approximation that the lateral trajectories of the aircraft 100 are identical, regardless of the speed profile concerned. The reference trajectory of the aircraft 100 can, for example, be chosen as the trajectory corresponding to the optimum speed profile $V_{opt}(X)$. This approximation does not of course correspond to reality, in which the flight mechanics impose different trajectories, in the horizontal plane, depending on the flight speeds of the aircraft 100, primarily during turn phases or transitions between different legs of the flight plan. It is also possible to consider the trajectory to correspond to a known speed profile that makes it possible to observe the RTA, if such a speed profile is available. It is even possible to calculate the trajectory transitions on the basis of the speed of the profile, augmented by a tolerance margin that makes it possible, from one refresh to another in the calculations, to compensate for any drifts. In practice, the duly defined trajectory cannot in reality be implemented at maximum speed for example, but the maximum speed profile is intended only to provide a time-of-passage reference on the curvilinear abscissa of a common trajectory.

It should also be observed that, regardless of the reference speed profile concerned, that is to say $V_{min}(X)$, $V_{max}(X)$ or $V_{opt}(X)$, the ground speed of the aircraft 100 depends only on the curvilinear abscissa X, and not on time. This approximation is based on the assumption that the properties of a stationary system are applicable. These stationarity properties are linked to the fact that the atmospheric model used is stationary. However, it is possible to consider as an approximation that the system is virtually stationary, if variations in meteorological data are introduced, but remain slow, which is generally the practical case, given the time-of-passage differences between the profile $V_{min}(X)$ and the profile $V_{max}(X)$.

The times of passage $T(X)$ predicted at the curvilinear abscissa $X_{pred}$ are stored, to be used as and when predictions are subsequently refreshed.

According to the method of the present invention, the FMS notes the time of passage of the aircraft 100 at particular points of the flight plan, for example at waypoints WPT.

Figure 2:
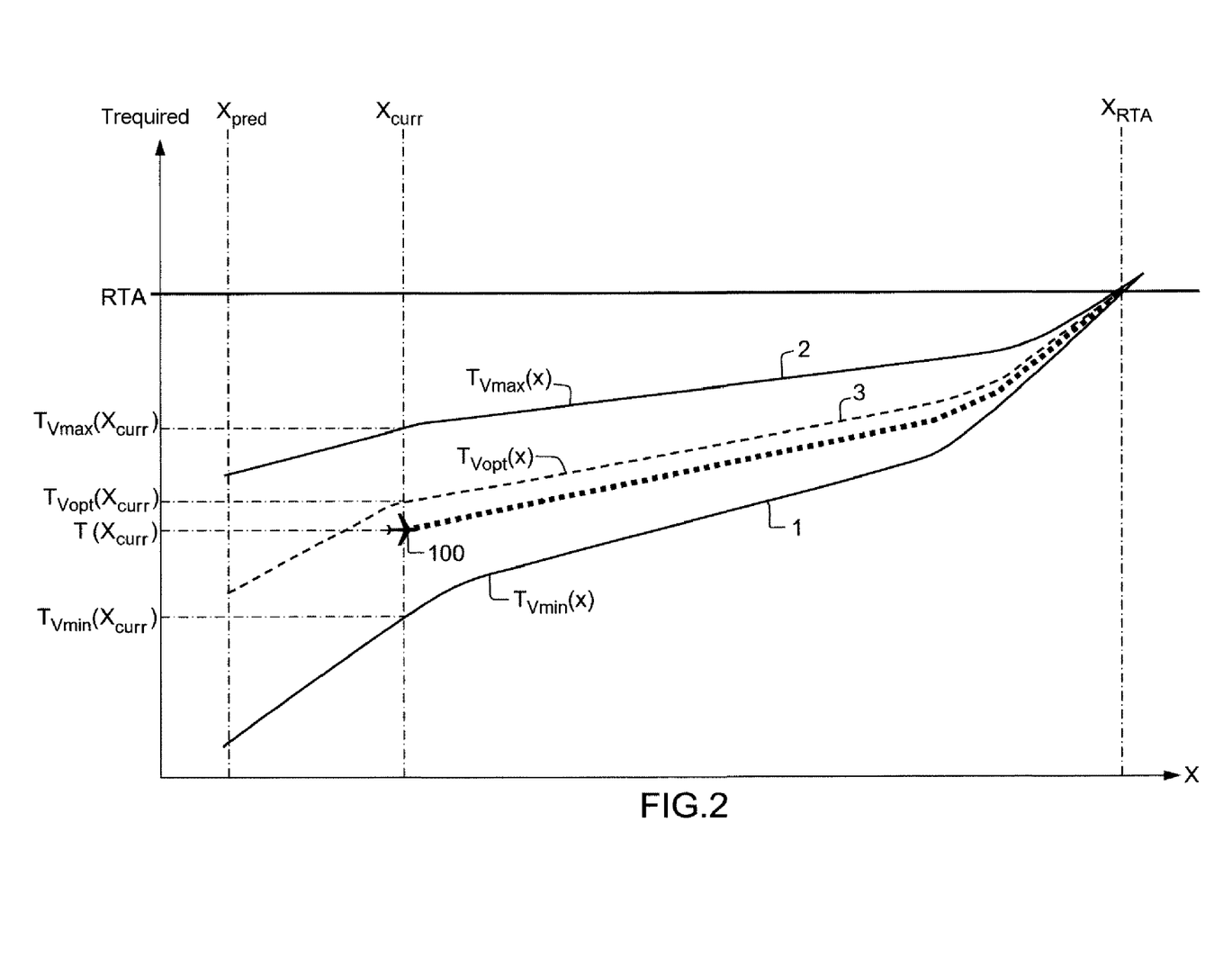
FIG. 2, examples of curves representing the times of passage of an aircraft at curvilinear abscissae along its flight plan, for flights following different speed profiles, transposed so as to culminate in a given RTA at the curvilinear abscissa corresponding to the point of constraint.

FIG. 2 shows examples of curves representing the times of passage of an aircraft at curvilinear abscissae along its flight plan, for flights following different speed profiles, transposed so as to culminate in a given RTA at the curvilinear abscissa $X_{RTA}$ corresponding to the point of constraint. FIG. 2 is based on the same speed profiles as FIG. 1, and illustrates the principles described hereinbelow.

The time of passage at a current abscissa point $X_{curr}$ is denoted $T(X_{curr})$. At the same time, the FMS evaluates $T_{Vmax}(X_{curr})$, which corresponds to the time of passage of the aircraft 100 at the curvilinear abscissa point $X_{curr}$, required for the latter to fly according to the maximum speed profile $V_{max}$ and for it to reach the curvilinear abscissa point $X_{RTA}$ at which the RTA is applied, at the required RTA time, hereinafter denoted $T_{RTA}$. Similarly, the FMS evaluates $T_{Vmin}(X_{curr})$, which corresponds to the time of passage of the aircraft 100 at the curvilinear abscissa point $X_{curr}$, required for the latter to fly according to the minimum speed profile $V_{min}$ and for it to reach the curvilinear abscissa point $X_{RTA}$ at the required time $T_{RTA}$. Finally, the FMS evaluates $T_{Vopt}(X_{curr})$, which corresponds to the time of passage of the aircraft 100 at the curvilinear abscissa point $X_{curr}$, required for the latter to fly according to the optimum speed profile $V_{opt}(x)$ and for it to reach the abscissa point $X_{RTA}$ at the required time $T_{RTA}$. In FIG. 2, these principles are illustrated by a translation of the curves of FIG. 1 representing the times of passage according to the different speed profiles, so that they all meet at the abscissa point $X_{RTA}$ and ordinate point $T_{RTA}$.

It should be noted that the required times of passage $T(X)$ according to the different speed profiles $V_{min}(X)$, $V_{max}(X)$ and $V_{opt}(X)$ are calculated by the FMS, for example with periodic refreshes, or done at given points of the flight plan. Such a point is represented in FIGS. 1 and 2, and its curvilinear abscissa is denoted $X_{pred}$. In an exemplary embodiment, the values $T_{Vmin}(X)$, $T_{Vmax}(X)$ and $T_{Vopt}(X)$ can be recalculated based on the profiles $ETA_{Vmin}(X)$, $ETA_{Vmax}(X)$ and $ETA_{Vopt}(X)$ stored in the memory of the FMS or of a device linked to the FMS, for a set of discrete points of the trajectory, corresponding, for example, to the waypoints WPT of the flight plan. The memory of the device then contains a plurality of pairs of values $(ETA_{Vmin}(X_i), X_i)$, $(ETA_{Vmax}(X_i), X_i)$ and $(ETA_{Vopt}(X_i), X_i)$. The values $ETA_{Vmin}(X)$, $ETA_{Vmax}(X)$ and $ETA_{Vopt}(X)$ can then be calculated by interpolation between the stored values at the points preceding and following the current position. The robustness of the method according to the present invention makes it possible to employ a linear interpolation technique with sufficient accuracy.

The values $T_{Vmin}(X)$, $T_{Vmax}(X)$ and $T_{Vopt}(X)$ are then established according to the following formulae:

Time of passage required to observe the RTA by flying according to the speed profile $V_{min}$:

$$T_{Vmin}(x) = ETA_{Vmin}(x) + T_{RTA} - ETA_{Vmin}(X_{RTA})$$

Time of passage required to observe the RTA by flying according to the speed profile $V_{opt}$:

$$T_{Vopt}(x) = ETA_{Vopt}(x) + T_{RTA} - ETA_{Vopt}(X_{RTA})$$

Time of passage required to observe the RTA by flying according to the speed profile $V_{max}$:

$$T_{Vmax}(x) = ETA_{Vmax}(x) + T_{RTA} - ETA_{Vmax}(X_{RTA}).$$

By definition, the ground speed at a curvilinear abscissa point X can be expressed as:

$$V(X) = \frac{dX}{dt}. \quad (1)$$

It is thus also possible to write:

$$dt = \frac{dX}{V(X)}.$$

By incorporating dt along the trajectory, from the current curvilinear abscissa $X_{curr}$ to the curvilinear abscissa $X_{RTA}$, the following relation is obtained:

$$T(X_{RTA}) = T(X_{curr}) + \int_{X_{curr}}^{X_{RTA}} dX/V(X). \quad (2)$$

Hereinafter, in the interests of simplicity, we will use $\phi_N$ to denote the flight time between two points at a speed $V_N(X)$, $V_N(X)$ representing $V_{min}(X)$, $V_{opt}(X)$ or $V_{max}(X)$; thus:

$$\varphi_{VN}(X_{curr}, X_{RTA}) = \int_{X_{curr}}^{X_{RTA}} dX/V_N(X), \quad (3)$$

and $$T_{VN}(X_{RTA}) = T_{VN}(X_{curr}) + \varphi_{VN}(X_{curr}, X_{RTA}). \quad (4)$$

According to the method of the invention, the FMS seeks to determine a speed profile $V_\Omega(x)$ in which the times of passage $T_\Omega(x)$ along the trajectory satisfy:

$$\begin{cases} T_\Omega(X_{curr}) = T_{curr} \\ T_\Omega(X_{RTA}) = T_{RTA}; \end{cases} \quad (5)$$

or even:

$$T_\Omega(X_{RTA}) = T_\Omega(X_{curr}) + \phi_\Omega(X_{curr}, X_{RTA}) \quad (6).$$

Furthermore, according to the definition of the time profiles required at $V_{min}(X)$ and $V_{max}(X)$ given hereinabove, it is possible to write the following relation:

$$\begin{cases} T_{Vmin}(X_{RTA}) = T_{RTA} \\ T_{Vmax}(X_{RTA}) = T_{RTA}. \end{cases} \quad (7)$$

It is then possible to combine the preceding relations, to obtain the following relation:

$$\frac{\varphi_\Omega(X_{curr}, X_{RTA}) - \varphi_{min}(X_{curr}, X_{RTA})}{T_{Vmin}(X_{curr}) - T_{curr}} = \frac{\varphi_\Omega(X_{curr}, X_{RTA}) - \varphi_{max}(X_{curr}, X_{RTA})}{T_{Vmax}(X_{curr}) - T_{curr}}, \quad (8)$$

which can also be written as follows:

$$\varphi_\Omega(X_{curr}, X_{RTA}) = \frac{(T_{Vmax}(X_{curr}) - T_{curr})\varphi_{min}(X_{curr}, X_{RTA}) - (T_{Vmin}(X_{curr}) - T_{curr})\varphi_{max}(X_{curr}, X_{RTA})}{T_{Vmax}(X_{curr}) - T_{Vmin}(X_{curr})}. \quad (9)$$

The relation (9) can be satisfied by a large number of speed profiles $V_\Omega$. It is possible, in one embodiment of the invention, to choose a speed profile that satisfies the relation (9) at any point of the trajectory. This is equivalent to considering that the FMS determines a speed profile such that the proportion ratios between the flight times to RTA, or: $T_{RTA} - T_{Vmin}(X)$, $T_{RTA} - T_{Vmax}(X)$ and $T_{RTA} - T_{Vopt}(X)$, remain constant along the entire trajectory.

Thus, according to this embodiment, the speed profile can be determined by satisfying the following relation:

$$\frac{1}{V_\Omega(X)} = \frac{(T_{Vmax}(X) - T(X))\frac{1}{V_{min}(X)} - (T_{Vmin}(X) - T(X))\frac{1}{V_{max}(X)}}{T_{Vmax}(X) - T_{Vmin}(X)}. \quad (10)$$

The speed setpoint to be applied at any point of the trajectory is then written:

$$V_\Omega(X) = \frac{(T_{Vmax}(X) - T_{Vmin}(X))V_{min}(X)V_{max}(X)}{(T_{Vmax}(X) - T(X))V_{max}(X) - (T_{Vmin}(X) - T(X))V_{min}(X)}. \quad (11)$$

It is therefore possible, knowing the required time-of-passage and ground speed at maximum and minimum speed profiles, to deduce therefrom a speed setpoint which takes account of the current ETA. This setpoint can be used both in the calculation of the predictions along the flight plan, and in the guidance setpoints to ensure that the RTA is observed, in particular on approaching the latter.

The trend of the predicted ETA along the trajectory of the aircraft 100 can then be illustrated by the curve 200 represented in FIG. 2, starting from the aircraft 100 at the abscissa $X_{curr}$ and ending at the abscissa point $X_{RTA}$ and ordinate point $T_{RTA}$.

Figure 3:
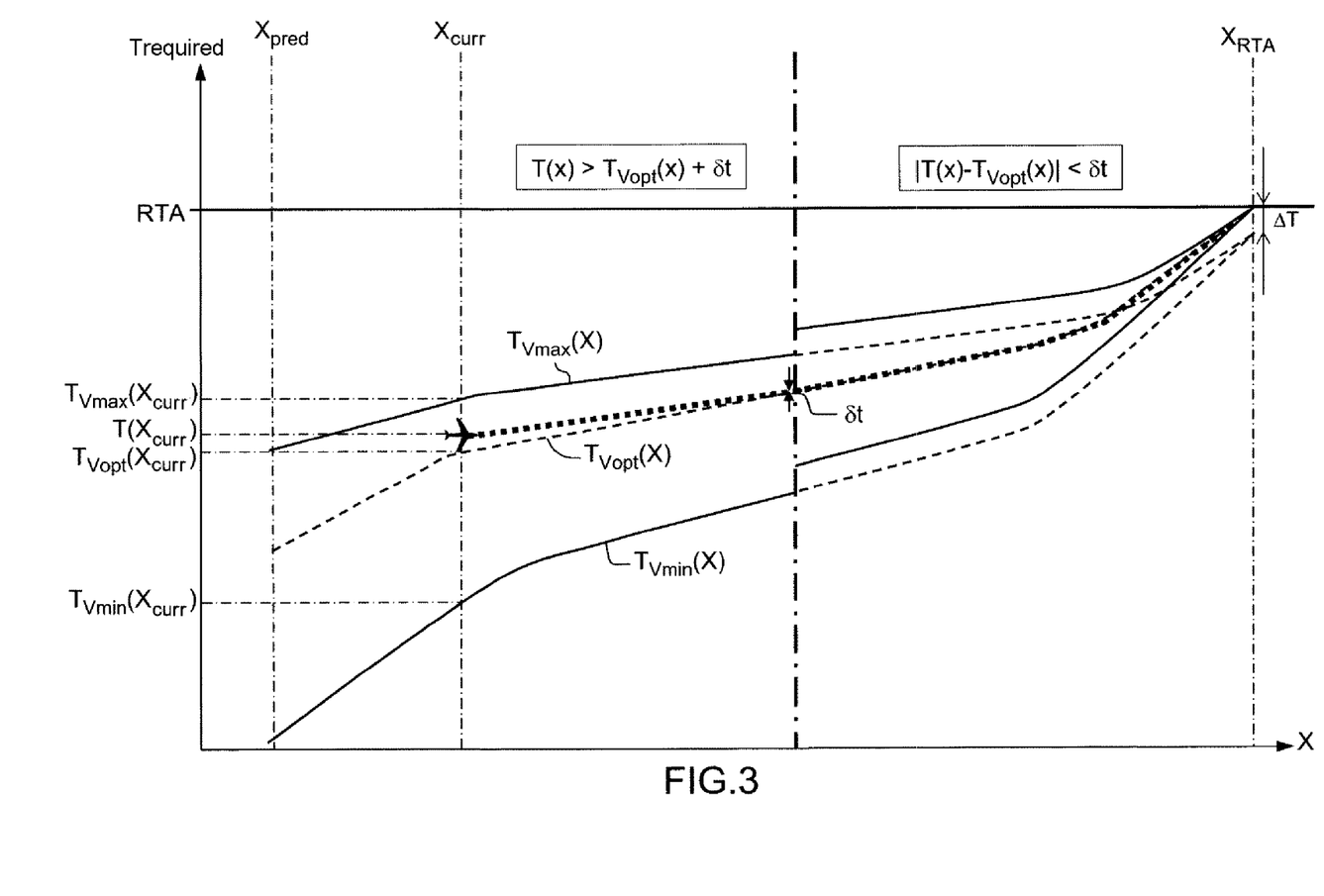
FIG. 3, examples of curves representing the times of passage of an aircraft, in a case where the aircraft is converging towards an optimum profile according to one embodiment of the invention.

FIG. 3 shows examples of curves representing the times of passage of an aircraft, in a case where the aircraft is converging towards an optimum profile, according to one embodiment of the invention.

It may in fact be advantageous to force the convergence of the flight time profile of the aircraft 100 towards the time profile corresponding to the optimum speed profile $V_{opt}(X)$. The way this convergence is determined is based on the choice of tolerance margins that are to be maintained to ensure that the RTA is observed.

Furthermore, this makes it possible to guarantee the observance of the RTA, while approaching as far as possible the optimum speed condition for which the initial trajectory was calculated.

To this end, the formula (11) is used, but it is biased to converge according to the case towards RTA, (RTA+$\Delta T$), or (RTA−$\Delta T$), in which $\Delta T$ designates a chosen tolerance, depending on whether the time of passage of the aircraft is close to, greater than or less than the time of passage that the aircraft would present by following the optimum speed profile $V_{opt}(X)$. In practice, the bias is applied in an opposite manner to the value of T(X).

$\delta t$ designates the desired maximum time deviation relative to the optimum speed profile.

The determination of the setpoint speed is made on the basis of a corrected time of passage $T_{corrected}(X)$, as follows:
If $T(X) < T_{Vopt}(X) - \delta t$, then:

$$T_{corrected}(X) = T(X) - \Delta T \quad (12):$$

Else, if $T(X) > T_{Vopt}(X) + \delta t$, then:

$$T_{corrected}(X) = T(X) + \Delta T \quad (13);$$

Else:

$$T_{corrected}(X) = T(X) \quad (14).$$

The speed setpoint taking into account the corrected time of passage can then be written according to the following relation:

$$V_\Omega(X) = \frac{(T_{Vmax}(X) - T_{Vmin}(X))V_{min}(X)V_{max}(X)}{(T_{Vmax}(X) - T_{corrected}(X))V_{max}(X) - (T_{Vmin}(X) - T_{corrected}(X))V_{min}(X)}. \quad (15)$$

In this way, the time profile of the flight of the aircraft 100 is forced to converge towards the profile corresponding to the optimum speed profile $V_{opt}(X)$, until in the vicinity $\delta t$ of the latter, then slaving is applied to the observance of the RTA according to the optimum speed profile $V_{opt}(X)$.

In the example illustrated by FIG. 3, the aircraft 100, in its current curvilinear abscissa position $X_{curr}$, is delayed relative to the assumed time of passage that it would have by following an optimum speed profile $V_{opt}(X)$ denoted by the reference symbol 3. Thus, the time at the RTA point is reduced by a tolerance $\Delta T$, and the method of the invention is implemented by targeting an RTA that is early relative to the current RTA. This RTA point corrected by the tolerance $\Delta T$ is targeted until the difference between the time of passage of the aircraft 100 and the time of passage that it would have by following the optimum speed profile 3 is below a chosen maximum time deviation $\delta t$. Then, it is the current RTA that is targeted.

According to one embodiment of the invention, it may be useful, in order to apply a strategy for optimizing the speed profile, to seek to achieve a given time of passage at an intermediate position along the flight plan. For example, it may be desirable to get to the top of climb, usually designated T/C, at a time $T_{Vmax}$ (time of passage required to achieve the RTA at $V_{min}$) in such a way as to accelerate as little as possible when climbing.

To get to the target position whose curvilinear abscissa is denoted $X_{tgt}$ at the time $T_{tgt}$, the preceding relations are applied in the same way:

$$T_{Vmin}(x) = \text{ETA}\_V_{min}(x) + T_{tgt} - \text{ETA}\_V_{min}(X_{tgt})$$

$$T_{Vmax}(x) = \text{ETA}\_V_{max}(x) + T_{tgt} - \text{ETA}\_V_{max}(X_{tgt})$$

If the wish is to get to this intermediate point with a tolerance $\Delta T$, this margin possibly being positive or negative depending on the case, then the current time can be corrected according to the following relation:

$$T_{corrected}(X) = T(X) + \Delta T.$$

The speed setpoint to be followed to reach this intermediate waypoint is then given by the relation (15).

This speed setpoint must then be bounded by the flight range, therefore by $V_{min}(X)$ and $V_{max}(X)$. In this way, an intermediate objective, even it is not achievable, may be used to guide a more global speed strategy.

This principle can also be used to establish a succession of time-of-passage setpoints, and serve as a basis for observing multiple RTAs.

It should be recalled that, for the assumptions defining the speed profile to remain applicable, it is essential for the different speed profiles to be established on a common trajectory of the aircraft 100. The latter may therefore not be achievable in practice, according to the maximum speed profile $V_{max}(X)$, or may prove highly sub-optimal according to the minimum speed profile $V_{min}(X)$. However, this is not of great importance, since it is sufficient for the trajectory to remain practicable according to the speed profile determined by the method of the invention.

Furthermore, it should be recalled that it has hitherto been considered that, for the first RTA observance prediction calculation, and in the absence of an initial speed profile with which to observe the RTA, the trajectory would have had to be calculated by using the speed profile $V_{opt}(X)$. Now, if the speed required at the start of the trajectory is too distant from $V_{opt}(X)$, the consequence may be an impracticable or sub-optimal trajectory.

It is possible to correct, at least partially, this consequence, by anticipating the speed correction that will be necessary, and by biasing accordingly the speed value that will be used to calculate the lateral transitions of the trajectory. This is applied for the calculation of the lateral trajectory, after a first calculation of predictions according to the speed profile $V_{opt}$ (X), which makes it possible to know the time $T_{V_{opt}}(X)$ required to observe the RTA.

Figure 4:
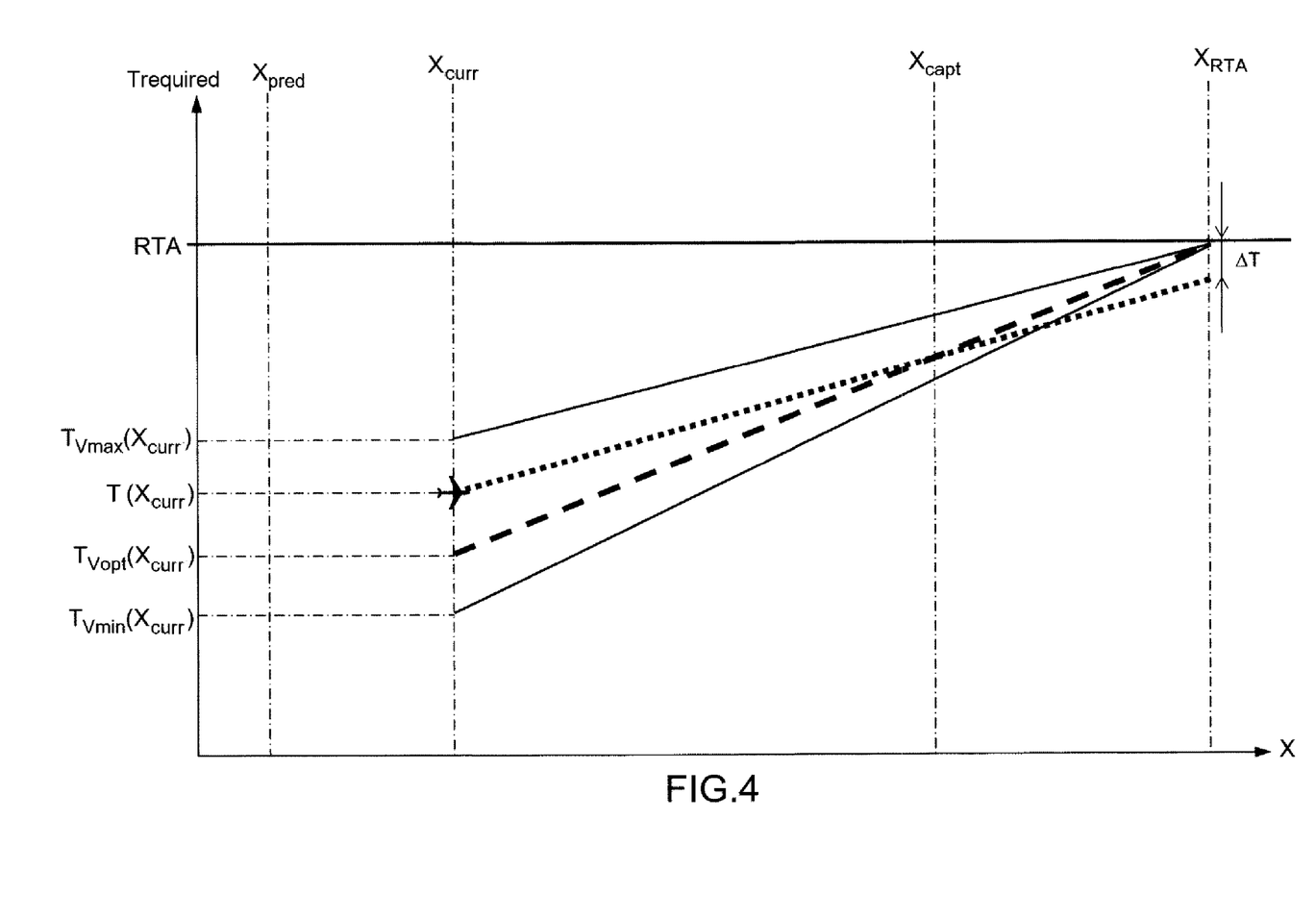
FIG. 4, examples of time-of-passage curves of an aircraft illustrating a speed correction calculation principle according to the invention.

FIG. 4 shows examples of time-of-passage curves of an aircraft illustrating a speed correction calculation principle according to the invention, and provides a better understanding of the following description.

To this end, it is assumed that, according to each speed profile, the ETA changes linearly up to the point at which the RTA constraint is applied. According to this assumption, the position $X_{capt}$ of capture of the profile $V_{opt}(X)$ can be approximated when the tolerance margin $\Delta T$ is applied to the RTA setpoint:

$$\Delta T = |T(X) - T_{Vopt}(X)| \frac{X_{capt} - X_{RTA}}{X - X_{capt}}, \quad (16)$$

$$X_{capt} = \frac{\Delta T \cdot X + X_{RTA}(|T(X) - T_{Vopt}(X)|)}{|T(X) - T_{Vopt}(X)| + \Delta T}. \quad (17)$$

It is then possible to linearly bias the speed of the profile $V_{opt}(X)$, by a bias $\delta V(X)$, which linearly approximates the speed correction that will be applied by the abovementioned relation (15) when calculating the speed setpoint in order to observe the RTA.

If $T(X) < T_{Vopt}(X) - \Delta T$ then:

$$\delta V(X) = V_{opt}(X) \frac{T_{Vopt}(X) - (T(X) - \Delta T)}{T_{RTA} - (T(X) - \Delta T)}; \quad (18)$$

else, if $T(X) > T_{Vopt}(X) + \Delta T$ then:

$$\delta V(X) = V_{opt}(X) \frac{T_{Vopt}(X) - (T(X) + \Delta T)}{T_{RTA} - (T(X) + \Delta T)}. \quad (19)$$

The relations (18) and (19) are only approximations, but they make it possible to limit the deviations between the speed profile that determines the trajectory, and the one that is actually applied in flight.

The remaining deviations can then be compensated for by the tolerance of the speed setpoint defined by the abovementioned relation (15), which naturally corrects the deviations and the biases on the predicted ETA, to make the predictions converge towards observance of the RTA.

Another advantage of the method according to the present invention is that it makes it possible to apply different strategies for determining speed setpoints along the flight plan, for example according to the different flight phases. It is, in practice, possible to determine strategies optimizing the use of the acceptable speed ranges according to the flight phase, or else according to portions of the flight plan on which the speed variations have a specific impact on an optimization criterion. To this end, it is possible to apply the speed setpoint formulae defined by the preceding relations, with judiciously selected margins and intermediate waypoints.

The description that follows presents possible choices of applicable strategies for determining speed setpoints, in the respectively typical climb, cruise and descent phases, according to the position of the RTA in the flight plan, and the time-related situation of the aircraft relative to reference time-related situations.

This description is given as an example, and is not limiting on the method according to the invention.

Figure 5A:
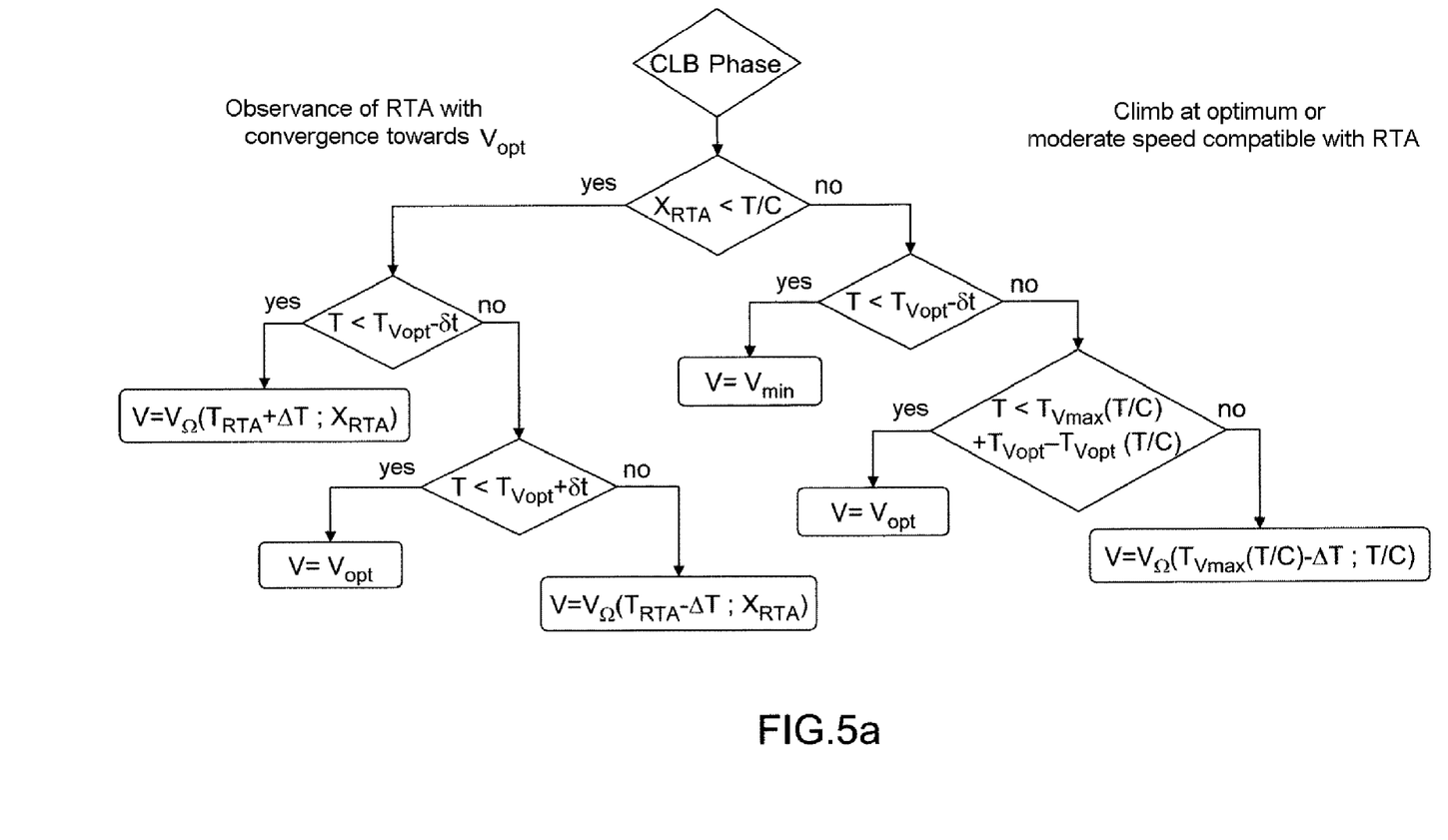
FIGS. 5a and 5b, respectively a flow diagram illustrating the various strategies that can be applied in the climb phase according to different configurations, and the corresponding time-of-passage curves, according to an exemplary embodiment of the invention.

FIG. 5a presents a flow diagram illustrating the different strategies that can be applied in the climb phase according to different configurations, according to an exemplary embodiment of the invention.

Figure 5B:
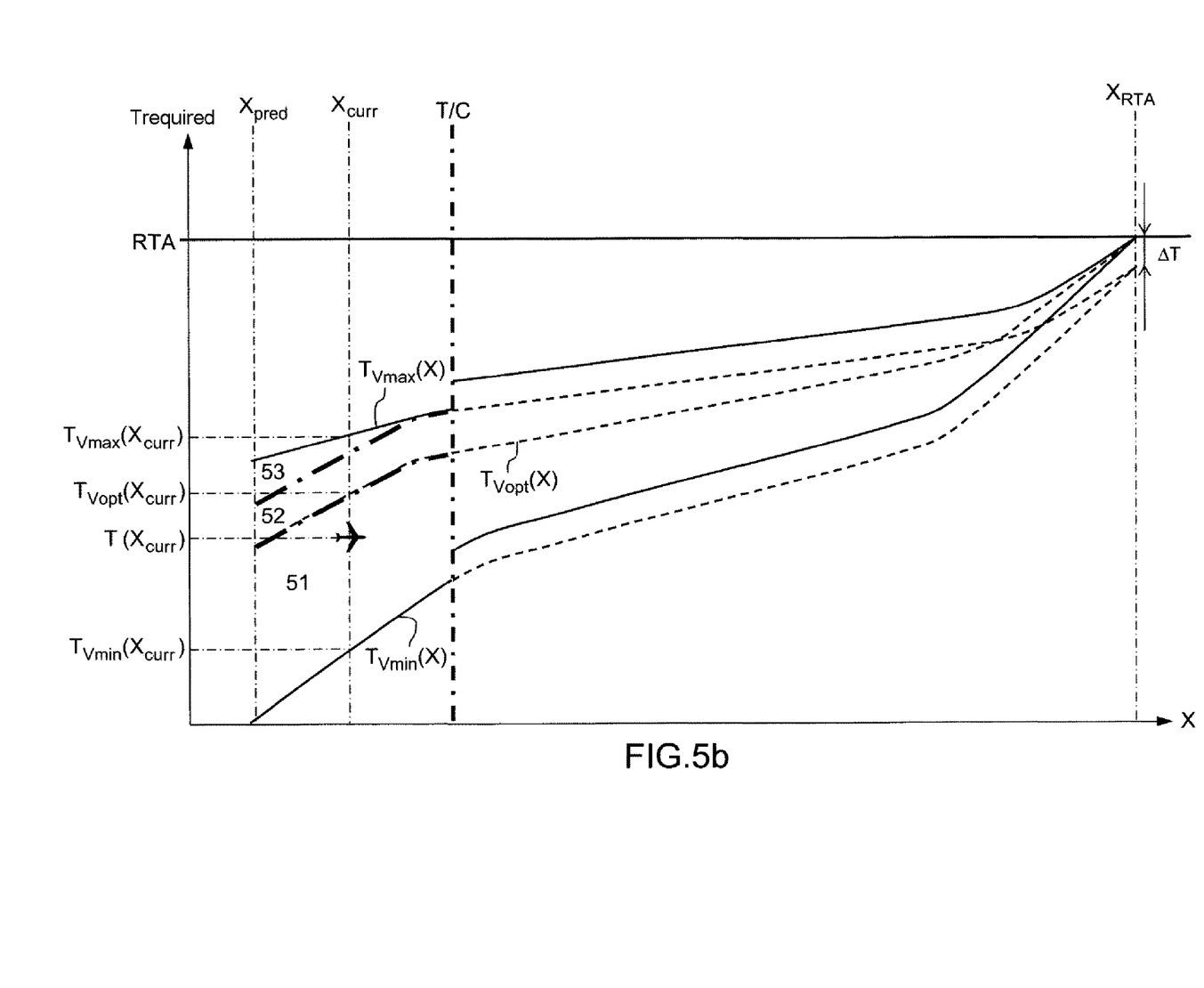

FIG. 5b gives the time-of-passage curves as a function of the curvilinear abscissa, illustrating the different strategies that can be applied in the climb phase.

When the aircraft is in the climb phase, or CLB phase, it is, for example, preferable to adopt a strategy that makes it possible to accelerate as little as possible, high speeds being unfavourable to an effective climb. The reference speed profile may then correspond to the pair of optimum speeds determining the cross-over altitude.

In this case:
if the RTA is situated ahead of the T/C point of abscissa $X_{T/C}$ and regardless of the time-related position of the aircraft, then the speed compensation can be distributed uniformly along the climb phase. The time of passage targeted for the point situated at the abscissa $X_{RTA}$ is the time $T_{RTA}$. The tolerance margin $\Delta T$ can be set to half the current maximum time deviation $\delta t$, according to the time-related position of the aircraft relative to $T_{Vopt}(X)$.
otherwise, that is to say, if the RTA is situated at a point belonging to the cruise phase or the descent phase, then:
if the time of passage $T(X)$ of the aircraft 100 at the abscissa point X is less than the corresponding time $T_{Vopt}(X)$ at the same point, in a first region 51 with reference to FIG. 5b, then it is possible for the aircraft 100 to fly according to the minimum speed profile $V_{min}(X)$ as long as $T(X)$ remains less than $T_{Vopt}(X)$, then to fly according to the optimum speed profile $V_{opt}(X)$;
if the time of passage $T(X)$ is less than $T_{Vmax}(X_{T/C}) + T_{Vopt}(X) - T_{Vopt}(X_{T/C})$, in a second region 52 with reference to FIG. 5b, then the time-related situation indicates that, by climbing according to the speed profile $V_{opt}(X)$, the aircraft 100 can ensure that the RTA is observed during the climb. In practice, the aircraft does not reach the point T/C later than the time $T_{Vmax}$. In this case, according to a first option, it is possible to fly according to the optimum speed profile $V_{opt}(X)$. According to a second option, it is possible to seek to minimize the acceleration during the climb phase. Referring to FIG. 5b, the targeted waypoint then has for abscissa that of the T/C point according to a flight at the maximum speed profile $V_{max}(X)$, and for ordinate the corresponding time of passage. The tolerance $\Delta T$ that is applied can then be set to a negative value, the absolute value of which equals half the current maximum time deviation $\delta t$.
if the time of passage $T(X)$ is greater than $T_{Vmax}(X_{T/C}) + T_{Vopt}(X) - T_{Vopt}(X_{T/C})$, in a third region 53 with reference to FIG. 5b, then it is possible to seek to minimize the acceleration during the climb, but the situation then dictates flying faster than according to the optimum speed profile $V_{opt}(X)$. Referring to FIG. 5b, the targeted waypoint then has for abscissa that of the T/C point according to a flight at the maximum speed profile $V_{max}(X)$, and for ordinate the corresponding time of passage $T_{Vmax}(X)$. The tolerance $\Delta T$ that is applied can then be set at a negative value, the absolute value of which equals half the current maximum time deviation $\delta t$.

Figure 6A:
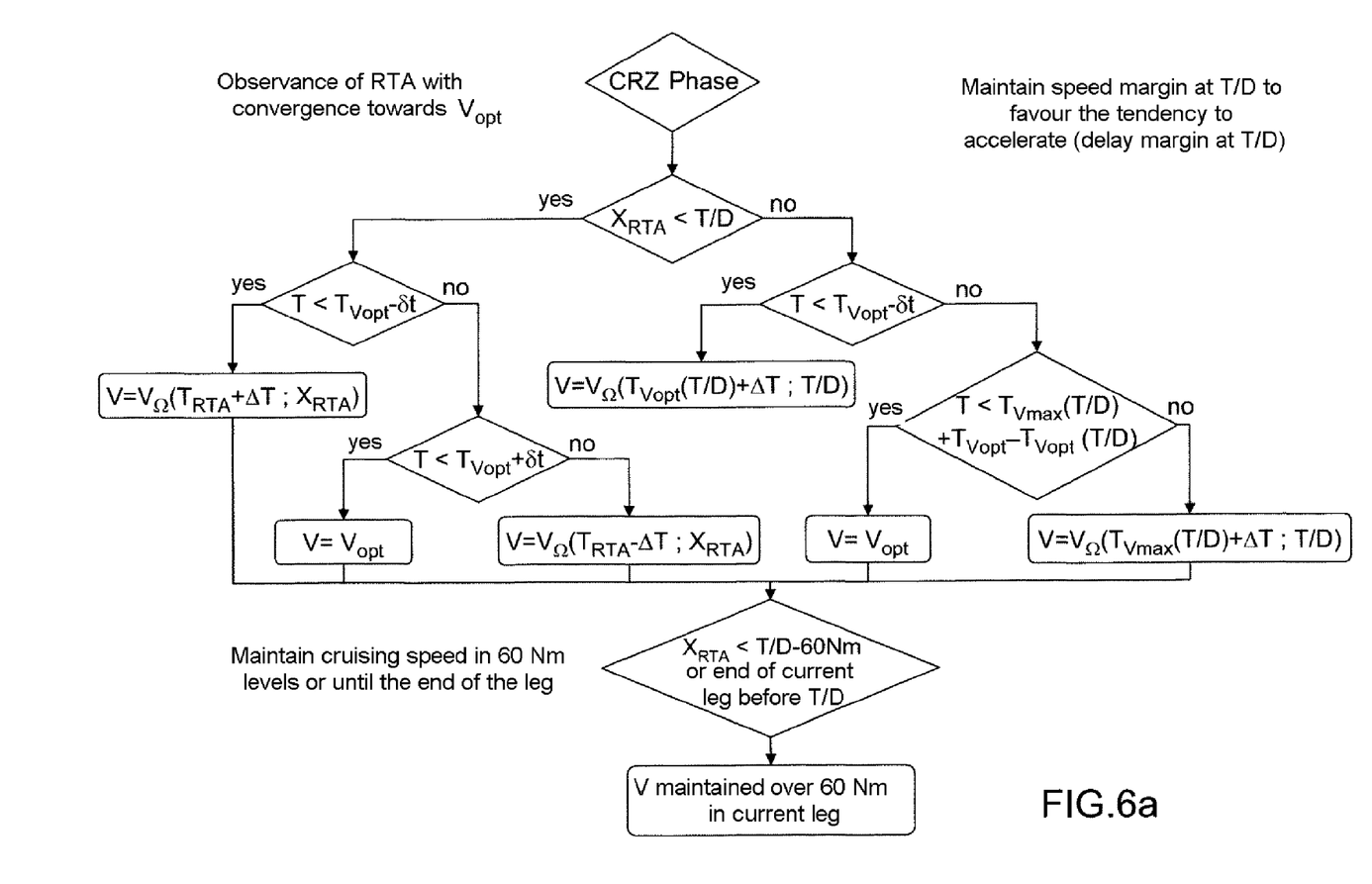
FIGS. 6a and 6b, respectively a flow diagram illustrating the various strategies that can be applied in the cruise phase according to different configurations, and the corresponding time-of-passage curves, according to an exemplary embodiment of the invention.

FIG. 6a is a flow diagram illustrating the different strategies that can be applied in the cruise phase according to different configurations, according to an exemplary embodiment of the invention.

Figure 6B:
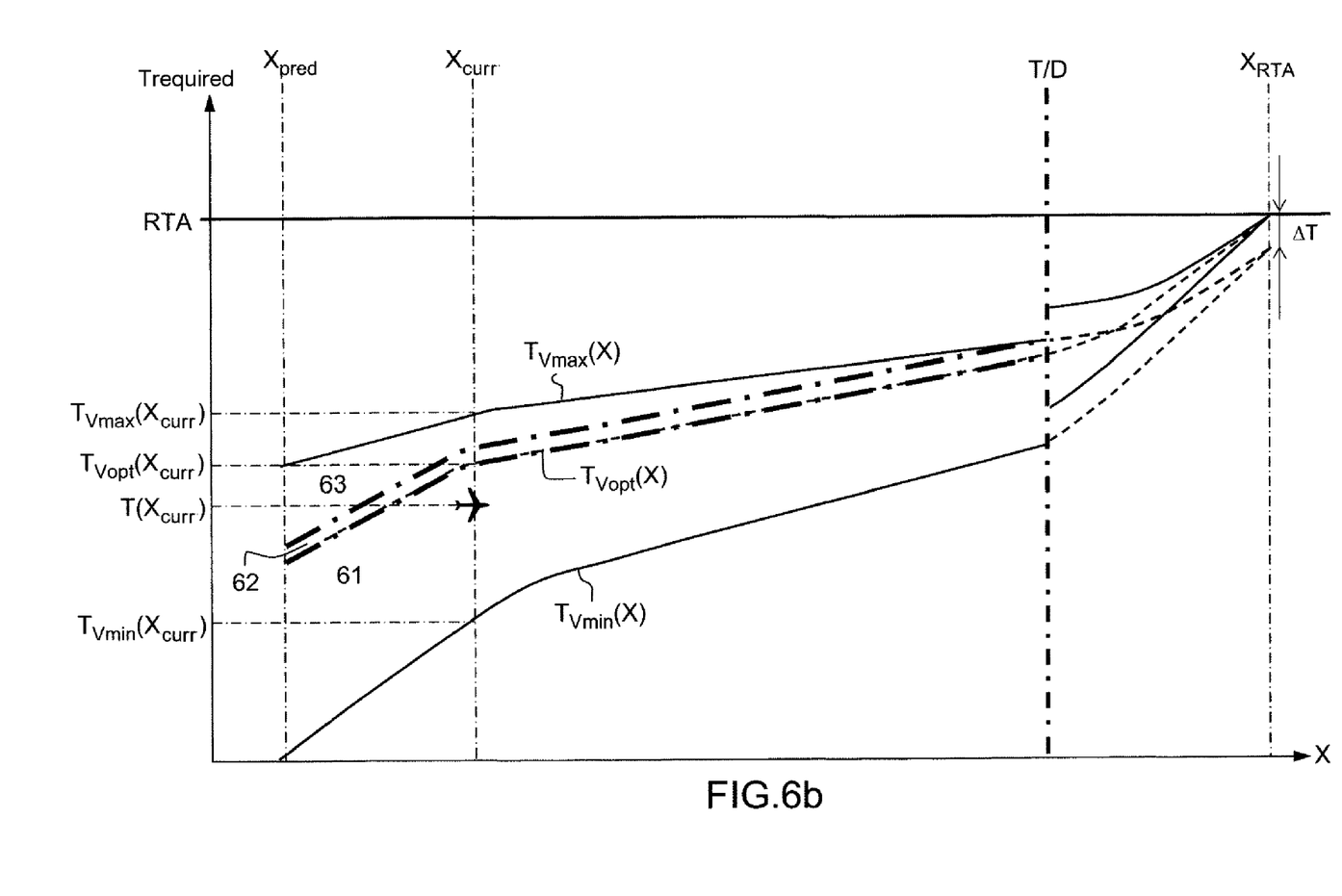

FIG. 6b gives the time-of-passage curves as a function of the curvilinear abscissa, illustrating the different strategies that can be applied in the cruise phase.

When the aircraft is now in the cruise phase, or CRZ phase:
- if the RTA is situated ahead of the top of descent point, usually designated T/D, of abscissa $X_{T/D}$, at a distance less than a determined distance from the aircraft 100, for example 60 Nm, and in the leg of the flight plan or current leg, then, regardless of the time-related position of the aircraft, the speed compensation can be distributed uniformly along the cruise phase. Referring to FIG. 6b, the targeted waypoint is the point situated at the abscissa $X_{RTA}$ and at the ordinate $T_{RTA}$. The tolerance can be set to half the current tolerance, according to the time-related position of the aircraft 100 relative to $T_{Vopt}(X)$;
- if the RTA is situated ahead of the T/D point of abscissa $X_{T/D}$, for example at a distance greater than a determined distance of 60 Nm, or beyond the current leg, then regardless of the time-related position of the aircraft 100, the speed compensation can be distributed uniformly along the cruise phase. However, once the speed setpoint has been calculated, the latter is maintained along the current leg, over a distance at most equal to 60 Nm, before once again determining a new speed setpoint. Referring to FIG. 6b, the targeted time of passage is the point situated at the abscissa $X_{RTA}$ and at the ordinate $T_{RTA}$. The tolerance $\Delta T$ can be set at half the current tolerance $\delta t$, according to the time-related position of the aircraft 100 relative to $T_{Vopt}(X)$;
- if the RTA is situated beyond the T/D point of abscissa $X_{T/D}$, then:
  - if the time of passage T(X) of the aircraft 100 is less than the time $T_{Vopt}(X)$, in a first region 61 with reference to FIG. 6b, then it is possible to seek to retain a speed margin in descent, therefore arrive at least at the time $T_{Vopt}(X_{T/D})$ at the point T/D. However, in order to avoid an unnecessary overcompensation, it is possible not to seek to immediately join the flight profile corresponding to the optimum speed profile $V_{opt}(X)$. Referring to FIG. 6b, the targeted waypoint then has for abscissa that of the T/D point and an ordinate equal to $T_{Vopt}(X_{T/D})$. The applied tolerance $\Delta T$ can then be set at a positive value equal to half the current maximum time deviation $\delta t$;
  - if the time of passage T(X) is less than $T_{Vmax}(X_{T/D})+T_{Vopt}(X)-T_{Vopt}(X_{T/D})$, in a second region 62 with reference to FIG. 6b, then the time-related situation indicates that, by flying according to the speed profile $V_{opt}(X)$, the aircraft can ensure that the RTA is observed while cruising. In practice, the aircraft does not reach the T/D point later than the time $T_{Vmax}$. Furthermore, it is preferable to favour a flight according to the optimum speed profile $V_{opt}(X)$, rather than to risk an unnecessary speed overcompensation. In this case, it is possible to fly according to the speed profile $V_{opt}(X)$.
  - if the time of passage T(x) is greater than $T_{Vmax}(X_{T/D})+T_{Vopt}(X)-T_{Vopt}(X_{T/D})$, in a third region 63 with reference to FIG. 6b, then it is possible to seek to provide a speed margin for the descent, therefore to minimize the acceleration, even though the time-related situation dictates authorizing flying faster than according to the optimum speed profile $V_{opt}(X)$. The targeted waypoint then has for abscissa that of the T/D point according to a flight at the maximum speed profile $V_{max}(X)$, and for ordinate the corresponding time of passage. The applied tolerance $\Delta T$ can then be set at a negative value, the absolute value of which equals half the current maximum time deviation $\delta t$.

Figure 7:
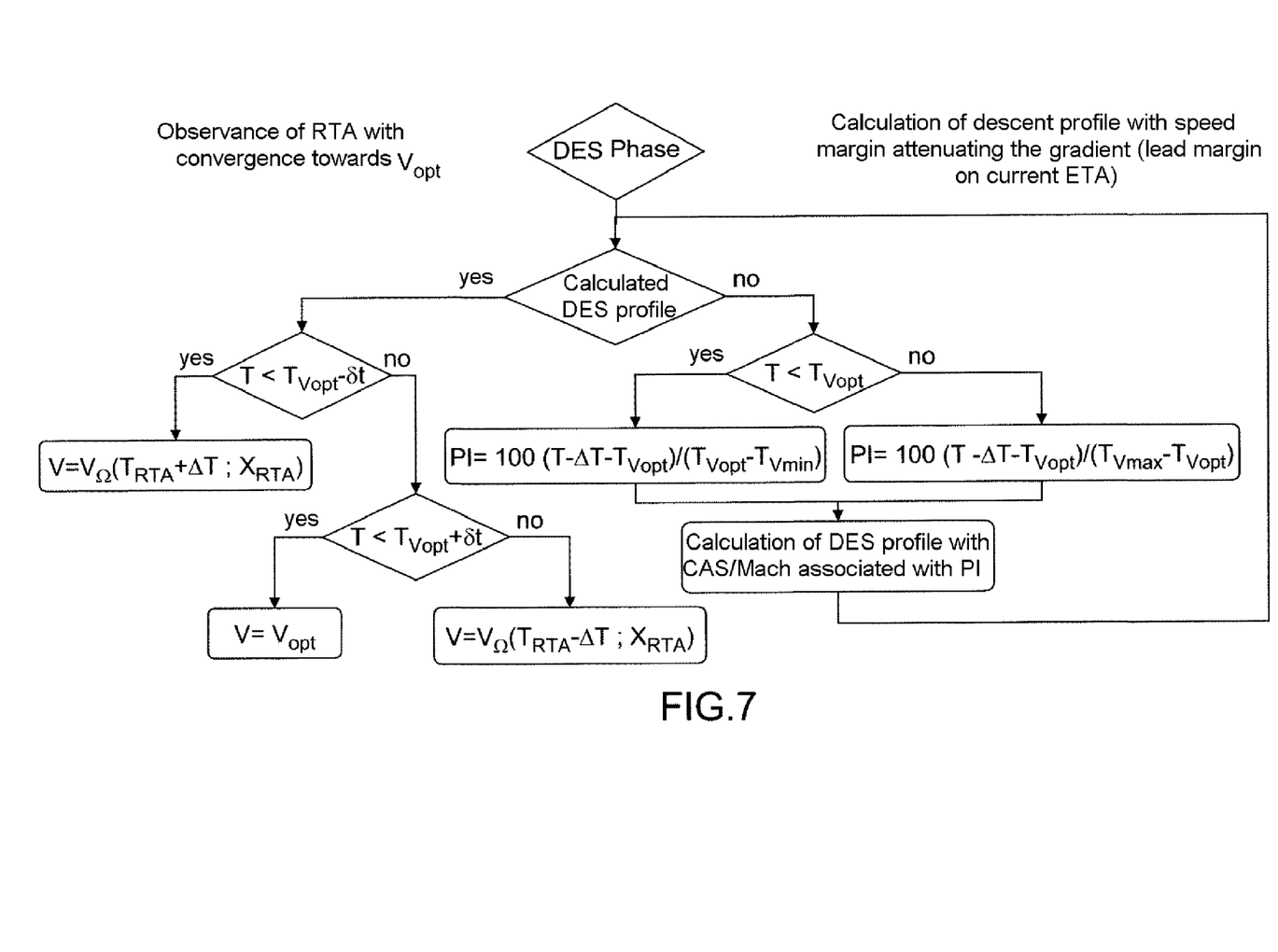
FIG. 7, a flow diagram illustrating the various strategies that can be applied in the descent phase according to different configurations, according to an exemplary embodiment of the invention.

FIG. 7 is a flow diagram illustrating the different strategies that can be applied in the descent phase according to different configurations, according to an exemplary embodiment of the invention.

When the aircraft is in the descent phase, or, to use the usual designation, DES phase, it is possible to seek to avoid switching to underspeed, because the practicable flight gradients are shallower, and keeping to the descent profile is then no longer possible. However, it is necessary beforehand to define the speeds with which the theoretical speed profile must be determined. In practice, the descent predictions are made in two stages: firstly, the calculation of a theoretical descent profile, determined by starting from the arrival airport, and which determines the descent profile required to ensure approach and landing; then, a prediction calculation deriving from the current position and used to converge with the theoretical descent profile. Before determining the predictions to be applied during the descent, it is therefore necessary to determine the theoretical descent profile. This profile is generally based on a pair of setpoint speeds (one Mach setpoint and one air speed setpoint, usually designated by the acronym CAS, standing for Computed Air Speed) applicable to the entire descent as long as no speed constraint is imposed by the arrival procedure. The descent is then made at constant Mach, according to the Mach setpoint, for the high altitudes, then at constant CAS, according to the CAS setpoint, for the low altitudes. The transition altitude between these two setpoints is called cross-over altitude, for which the CAS and Mach speeds correspond to the same physical speed (usually designated by the acronym TAS, standing for True Air Speed).

In order to avoid making an iterative calculation on the speeds of the theoretical profile during the descent phase, it is possible to determine a performance index, designated PI, or any other type of index, for example a cost-type index. This index PI is then used to determine the speeds to be applied for the theoretical descent profile; this theoretical profile is not recalculated during the descent, except in the event of a modification of the flight plan.

To determine the PI of the descent, the first step is, for example, to calculate the theoretical descent profiles at $V_{opt}$, $V_{min}$ and $V_{max}$. The required times of passage $T_{Vmin}(X)$, $T_{Vopt}(X)$ and $T_{Vmax}(X)$ are then deduced therefrom. The performance index to be applied is then determined by comparing the current ETA with these required times of passage. A PI with a value of between −100 and 0 corresponds to the relative positioning of the ETA between $T_{Vmin}(X)$ and $T_{Vopt}(X)$, and is reflected in a speed that is situated in the same proportion between $V_{min}$ and $V_{opt}$. Similarly, a PI with a value of between 0 and 100 corresponds to the relative positioning of the ETA between $T_{Vopt}(X)$ and $T_{Vmax}(X)$, and is reflected in a speed that is situated in the same proportion between $V_{opt}$ and $V_{max}$. A negative tolerance $\Delta T$ can be applied to the ETA, equal to the current maximum time deviation $\delta t$, in order to impose shallower gradients on the theoretical profile.

Thus, if the current ETA minus $\Delta T$ is less than $T_{Vopt}(X)$:

$$PI = 100 \frac{T - \Delta T - T_{Vopt}}{T_{Vopt} - T_{Vmin}}$$

Also, the CAS and Mach speeds applied during the descent will be determined with the same ratio:

$$V = \frac{PI}{100}(V_{min} - V_{opt}).$$

Similarly, if the current ETA minus ΔT is greater than $T_{V_{opt}}(X)$:

$$PI = 100\frac{T - \Delta T - T_{Vopt}}{T_{Vmax} - T_{Vopt}}$$

Also, the CAS and Mach speeds applied during the descent will be determined with the same ratio:

$$V = \frac{PI}{100}(V_{max} - V_{opt})$$

Once the theoretical descent profile has been calculated with this pair of optimum speeds, the predictions are applied relative to this theoretical reference profile, by using the following speed strategy.

Regardless of the position of the RTA relative to the current point, and regardless of the time-related situation, the strategy in the descent phase consists in compensating for the time deviations noted in order to converge towards the time constraint. The targeted time of passage is the point situated at the abscissa $X_{RTA}$ and at the ordinate $T_{RTA}$. The tolerance ΔT can be set at half the current maximum time deviation δt, according to the time-related position of the aircraft relative to $T_{V_{opt}}(X)$.

What is claimed is:

1. A method for generating a flight speed profile of an aircraft according to an RTA constraint, using a flight management system, said method comprising the following steps:
   for a determined current position of the aircraft along a flight plan, determination of at least two reference speed profiles according to the curvilinear abscissa X of the aircraft along the flight plan, comprising a minimum speed profile V min(X) and a maximum speed profile Vmax(X),
   storage of a plurality of pairs (Tvmin(Xi),Xi) and (Tvmax (Xi),Xi) of values of times of passage of the aircraft at curvilinear abscissa points Xi subsequent to the current position as far as the abscissa of the point at which the RTA is applied for the reference speed profiles,
   application at any point of curvilinear abscissa X of the flight plan of a speed setpoint VΩ(X) of the aircraft determined on the basis of the speed profiles V min(X) and V max(X) weighted by proportionality ratios between T(X), Tvmin(X) and Tvmax(X) with flight management system;
   T(X) designating the time of passage of the aircraft at the point of the flight plan of curvilinear abscissa X, Tvmax (X) designating the time of passage at the curvilinear abscissa point X, for a flight according to the minimum speed profile Vmin(X) reaching the point at which the RTA is applied by observing the RTA constraint, and Tvmin(X) designating the time of passage at the curvilinear abscissa point X, for a flight according to the maximum speed profile Vmax(X) reaching the point at which the RTA is applied by observing the RTA constraint, the values of Tvmin(X) and Tvmax(X) being determined by a linear interpolation based on the corresponding stored pairs of values for the closest points either side of the curvilinear abscissa point X.

2. The method for generating a flight speed profile of an aircraft according to claim 1, wherein, for the current position of the aircraft along the flight plan, an additional optimum speed reference speed profile $V_{opt}(X)$ is determined according to at least one defined flight criterion, the speed profile of the aircraft being constrained to tend towards the optimum speed profile $V_{opt}(X)$ by the addition to the RTA of a tolerance ΔT the sign of which is opposite to the sign of the difference between the time of passage of the aircraft at the current position and the corresponding time of passage $T_{vopt}(X)$, until the absolute value of the difference between T(X) and $T_{vopt}(X)$ is less than a maximum time difference δt, the RTA then being restored to its initial value.

3. The method for generating a flight speed profile of an aircraft according claim 2, wherein said at least one defined flight criterion comprises a cost index.

4. The method for generating a flight speed profile of an aircraft according to claim 2, wherein said at least one defined flight criterion comprises a performance index.

5. The method for generating a flight speed profile of an aircraft according to claim 1, wherein the speed setpoint $V_\Omega(X)$ is determined by the relation:

$$V_\Omega(X) = \frac{(T_{Vmax}(X) - T_{Vmin}(X))V_{min}(X)V_{max}(X)}{(T_{Vmax}(X) - T(X))V_{max}(X) - (T_{Vmin}(X) - T(X))V_{min}(X)}.$$

6. The method for generating a flight speed profile of an aircraft according claim 1, wherein the speed setpoint $V_\Omega(X)$ is determined by the relation:

$$V_\Omega(X) = \frac{(T_{Vmax}(X) - T_{min}(X))V_{Vmin}(X)V_{max}(X)}{(T_{Vmax}(X) - T_{corrected}(X))V_{max}(X) - (T_{Vmin}(X) - T_{corrected}(X))V_{min}(X)},$$

$T_{corrected}(X)$ being equal to T(X)−δt if T(X) is less than $T_{vopt}(X)$−δt, to T(X)+δt if T(X) is greater than $T_{vopt}(X)$+δt, or to T(X) otherwise.

7. The method for generating a flight speed profile of an aircraft according to claim 1, wherein the speed setpoint $V_\Omega(X)$ is corrected by a value δV(X) equal to $$V_{opt}(X)\frac{T_{Vopt}(X) - (T(X) - \Delta T)}{T_{RTA} - (T(X) - \Delta T)}$$

if T(X) is less than $T_{vopt}(X)$−ΔT, or to $$V_{opt}(X)\frac{T_{Vopt}(X) - (T(X) + \Delta T)}{T_{RTA} - (T(X) + \Delta T)}$$

if T(X) is greater than $T_{vopt}(X)$+ΔT.

8. The method for generating a flight speed profile of an aircraft according to claim 1, wherein said method generates a plurality of speed profiles so as to observe a plurality of successive time of passage constraints along the flight plan.

9. The method for generating a flight speed profile of an aircraft according claim 1, wherein a plurality of different speed profiles are generated for different flight phases for which the optimum speed profiles are determined on the basis of different flight criteria.

10. A flight management system of an aircraft, wherein the system implements the meyhod according to claim 1.

11. The flight management system of an aircraft according to claim 10, wherein the flight management system calculates, at any instant of the flight of the aircraft, a speed setpoint to be applied to the flight management system.

12. The flight management system of an aircraft according to claim 10, wherein the speed setpoint to be applied is displayed on a display interface.

13. The flight management system of an aircraft according to claim 10, wherein the speed setpoint to be applied is transmitted to an automatic pilot system.

14. A method of generating a flight speed profile of an aircraft according to an RTA constraint by a flight management system, said method comprising:
- determining for a current position of the aircraft along a flight plan, at least two reference speed profiles according to a curvilinear abscissa X of the aircraft along the flight plan by the flight management system, comprising a minimum speed profile Vmin(X) and a maximum speed profile Vmax(X);
- storing a plurality of pairs (Tvmin(Xi),Xi) and (Tvmax(Xi),Xi) values of times of passage of the aircraft at curvilinear abscissa points Xi subsequent to the current position along the abscissa at the point at which the RTA is applied for the reference speed profiles; and
- applying at any point of the curvilinear abscissa X of the flight plan a speed setpoint VΩ(X) of the aircraft determined based on the speed profiles Vmin(X) and Vmax(X) weighted by proportionality ratios between T(X), Tvmin(X) and Tvmax(X) with the flight management system,
- wherein T(X) designates the time of passage of the aircraft at the point of the flight plan of the curvilinear abscissa X, Tvmax(X) designates the time of passage at the curvilinear abscissa point X, for a flight according to the minimum speed profile Vmin(X) reaching the point at which the RTA is applied by observing the RTA constraint, and Tvmin(X) designates the time of passage at the curvilinear abscissa point X, for a flight according to the maximum speed profile Vmax(X) reaching the point at which the RTA is applied by observing the RTA constraint, the values of Tvmin(X) and Tvmax(X) being determined by a linear interpolation based on the corresponding stored pairs of values for the closest points on either side of the curvilinear abscissa point X.

* * * * *